Figure 1:
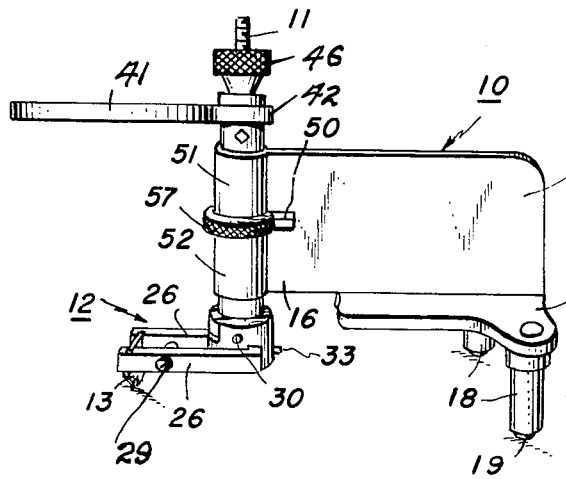

Feb. 21, 1956     H. K. ADAMS     2,735,178

ENGRAVING INSTRUMENT USED IN MAP MAKING

Filed July 22, 1955

INVENTOR
HAROLD K. ADAMS

BY *N.B. Willson & Co.*

ATTORNEYS

United States Patent Office 2,735,178
Patented Feb. 21, 1956

2,735,178
ENGRAVING INSTRUMENT USED IN MAP MAKING

Harold K. Adams, Riverdale, Md.

Application July 22, 1955, Serial No. 523,762

3 Claims. (Cl. 30—164.9)

This invention relates to engraving instruments or tools used in a modern method of making maps, and particularly to instruments of the type disclosed in my pending application Serial No. 386,082, filed October 14, 1953. Such tools scratch lines in a semitransparent coating on transparent sheet of plastic or glass placed over an aerial photograph of the area to be mapped, there being illuminating means beneath the photograph so that the operator may see through the coated sheet the roads, rivers, buildings and other landmarks and can reproduce or represent them on the sheet by scratching off portions of the coating. These scratched sheets are then used in making the desired map from which reproductions may be made.

The tool of said application comprises a carrier or body which may be conveniently grasped by the fingers and which has a three point contact with the sheet, two points being spaced legs to slide or roll on the sheet and the third point being the scratching point. The latter is at the free end of a horizontal arm which swings about a vertical axis carried by the tripod-like body of the tool. The scratching point or blade is held upright by the arm and the user manipulates the body to cause the arm to swing about its axis as the tool is moved so that the scratching element will follow the curved and irregular paths of rivers, roads, etc., in the illuminated photograph or negative of the area being mapped.

The principal object of the present invention is to improve and render more effective a tool such as disclosed in said patent application.

While the said tool or instrument is especially intended for scratching curved and irregular lines, and different scratching tools have been used to do straight line work, I find that the said tool may be effectively used for straight line scratching by providing it with means for locking or fixing the arm, and hence the scratching element, relative to the body. Hence another object of the invention is to provide a simple and effective chuck means between the body and a vertical rotatably mounted shaft which carries the swinging arm.

When the tool is to be used for scratching parallel or equally spaced lines to represent roads, the swinging arm may carry a blade with spaced scratching ends or points, or two or more straight scratching needles similar to ordinary phonograph needles. The spaced scratching ends must be accurately spaced because roads of different widths or other characteristics are represented by variously spacing the double lines in thousandths of an inch. It is at times necessary to hone the spaced scratching points or needles, and that can only be done effectively when the needles are fixed relative to the body or carrier. Another object is to provide a readily operated locking means for fixing the scratching elements relative to the body of the tool so that effective honing of the scratching needles or points may be performed.

With the above and other objects and advantages in view, the invention resides in the novel combinations and arrangements of parts and the novel features of construction hereinafter described and claimed, and illustrated in the accompanying drawings which show the present preferred embodiment of the invention.

Figure 3:
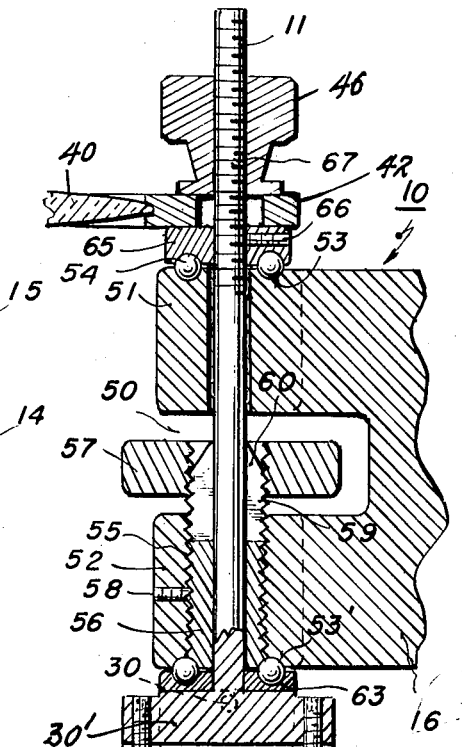
Figure 2:
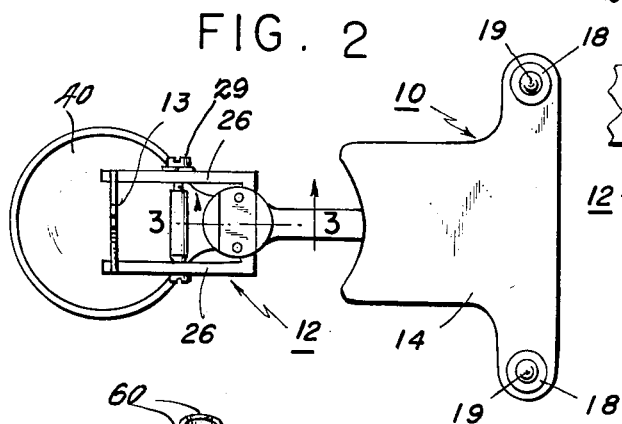
Figure 4:
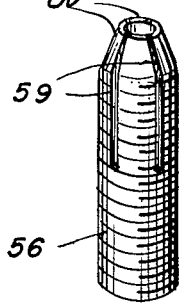

In the drawings:

Fig. 1 is a perspective view of the improved tool;
Fig. 2 is a bottom plan view;
Fig. 3 is an enlarged vertical section taken on the line 3—3 in Fig. 2;
Fig. 4 is a detail perspective of the clutch screw.

Referring more in detail to the drawings the numeral 10 denotes as a whole a support or carrier, 11 an upright pivot or shaft rotatable thereon, 12 a horizontal swingable arm on the lower end of the shaft, and 13 a suitable scraping or engraving means on the outer end of the arm. The carrier or body 10 is adapted to be grasped by the fingers and moved over the coated sheet; and it preferably comprises a flat and suitably shaped horizontal base portion 14 and an upright plate or rib 15 extending in a forward and rearward direction and having its front end 16 projecting beyond the base. Extending downwardly from the rear corners of the somewhat triangular shaped base 14 are two supporting legs 18 equally spaced from the longitudinal center of the body. The legs slide over the coating and balls 19 are preferably rotatably mounted in their lower ends. Thus the body may have a slight rocking or tilting movement on the transversely alined balls to permit the fingers to apply a downward pressure on the end or ends of the scraping blade or needles.

The present invention deals principally with a friction locking means or chuck connection for fixing the shaft 11 relative to the body, and hence the arm 12 need not have an adjustable connection with the shaft, as in said pending application, and the scratching means 13 may be either a flat blade as disclosed in said application or a pair of needles as disclosed in my application Serial No. 523,761 filed simultaneously with this application and entitled "Needle Adapter for Map-Making Engraving Instruments." The drawings illustrate the adjustable mounting of the arm 12; and such mounting comprises a transverse pivot 30 about which the arm may swing vertically and which is carried by a coupling member 31, the latter being in turn mounted on a pivot 33 in a cross head 36 fixed to the rear end of the arm 12. The pivot 33 extends longitudinally of the arm and hence the latter may be tilted laterally. The two pivots are in planes at right angles to each other and adjusting screws are provided to control both the longitudinal and lateral tilting or angling movements of the arm, as fully disclosed in application Serial No. 386,082. The scraping element is shown as a flat blade clamped between resilient forks or branches 26 of the arm by a screw device 29.

The extended end 16 of the upright plate or web 15 is formed with a horizontal notch or recess 50 to provide upper and lower arms 51 and 52. When the body is cast or fabricated these arms are formed with alined bores through which the shaft 11 extends, and an annular seat 53 for bearing balls 54 may be formed in the top of the arm 51 concentric with the bore. A similar seat 53' may be formed in the bottom of the arm 52. However the bore in the lower arm is enlarged and internally screw threaded at 55 to receive a hollow screw 56 through the bore of which the shaft extends, as seen in Fig. 3. The screw 56 forms one member of a friction clamp or chuck to lock the shaft against rotation, the other member being a nut 57 on the screw and disposed in the notch 50 for limited rotational movement along the screw. The screw is held fixed by a set screw 58 with its upper end extending partly into the notch. That end is slightly tapered and formed with an annular series of radial slots 59 to provide resilient jaws 60 to frictionally grip the shaft when the nut is turned down on screw, the threaded hole in the nut being also slightly tapered. The nut 57 is circular with a milled edge and has a diameter greater than the thickness of the end 16 of the plate so that it may be readily rotated to lock and unlock the shaft. Since the bore in the lower arm 52 is enlarged to receive the screw 56, it is necessary to recut the ball race 53' so that a part of it is formed in the lower end of the screw as seen in Fig. 3. An annular series of anti-friction balls 61 is seated in this race and in an opposed race or groove 63 in a disk which has a pressed fit on the shaft 11 and is disposed against a cross head 30' on the lower end of the shaft, such cross head carrying the pivot pin 30. While the ball race 53 might be formed in a similar disk, it is preferably formed in the top of the arm 51. The annular series of anti-friction balls 54 is seated in that race and in an opposed race formed in a disk 65 disposed above the arm 51 and fastened by a set screw 66 to the shaft. The projecting upper end of the shaft 11 is screw threaded at 67 and the disk or collar is threaded thereon so that it may be adjusted before being fixed by the screw 66. The shaft 11 may thus be adjusted in the head so that it will have no endwise motion and will turn freely because of the ball bearings when it is not locked by the chuck or clamping means.

If desired a magnifying lens 40 in a frame 41 may be fixed to the upper end of the shaft to swing laterally therewith so that it will always be above the free end of the arm 12. An arm 42 on the frame is slotted to receive the shaft and permit adjustment of the lens. A nut 46 on the threaded upper end of the shaft clamps the arm or projection 42 on the top of the disk 65.

When it is desired to use the improved tool for scratching straight lines, the nut 57 is turned down on the screw 56 to cause its jaws 60 to bind the shaft against rotary movement in the body. The legs 18 may then be moved along a suitably positioned straight edge held on the coated sheet. If it is necessary to hone the scratching point or points of the blade or needles, the shaft is similarly locked and the legs may be moved along a straight edge or jig suitably placed relative to the hone.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. An engraving instrument for use in map making having an elongated body to be grasped by the fingers and moved over a coated sheet, means at the rear of the body to support it for sliding movement, an upright shaft rotatably mounted at the front of the body, a horizontal swingable arm projecting laterally from the lower end of said shaft, a tool having a scratching end carried by the free end of said arm, and frictional clamping means interposed between said shaft and said body to hold said shaft against rotation and prevent swinging movement of the arm relative to the body.

2. The structure of claim 1 in which the front portion of said body includes an upright plate with a horizontal notch forming upper and lower arms with alined vertical openings through which said shaft extends, and in which said frictional clamping means comprises a clutch sleeve fixed concentrically in said lower arm with its upper end disposed in said notch, said sleeve having a bore to rotatably receive said shaft and also having external screw threads, the projecting upper end of said sleeve being tapered and formed with radial longitudinally extending slits to provide an annular series of shaft-clamping jaws, and a nut member disposed in said notch and internally screw threaded to receive and coact with the tapered screw threaded end of said sleeve.

3. The structure of claim 2 in which said shaft has an enlarged head at its lower end and a screw threaded upper end, an antifriction ball bearing unit surrounding said shaft between its enlarged head and said lower arm, another anti-friction ball bearing unit surrounding said shaft at the top of said upper arm and including a ball raceway collar adjustable on the threaded portion of said shaft, and means fixing said collar in an adjusted position.

No references cited.